J. E. BINNS, Jr.
GEARING.
APPLICATION FILED APR. 15, 1911.
1,020,595.
Patented Mar. 19, 1912.
2 SHEETS—SHEET 2.
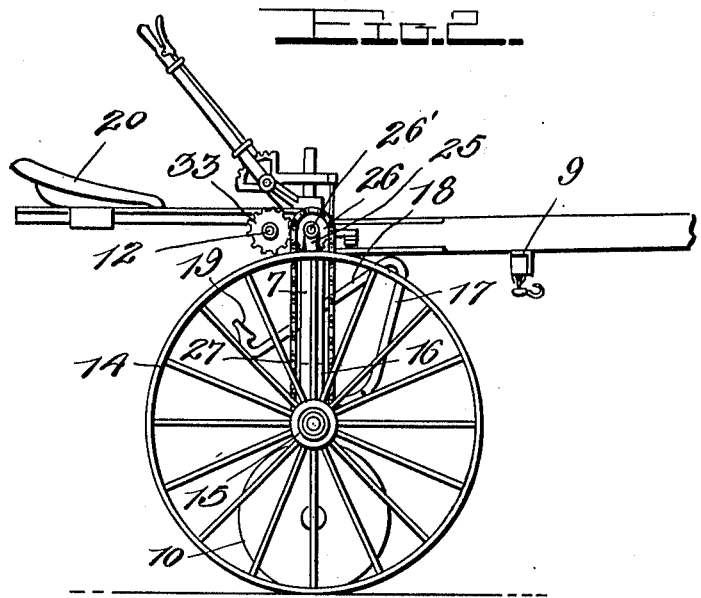
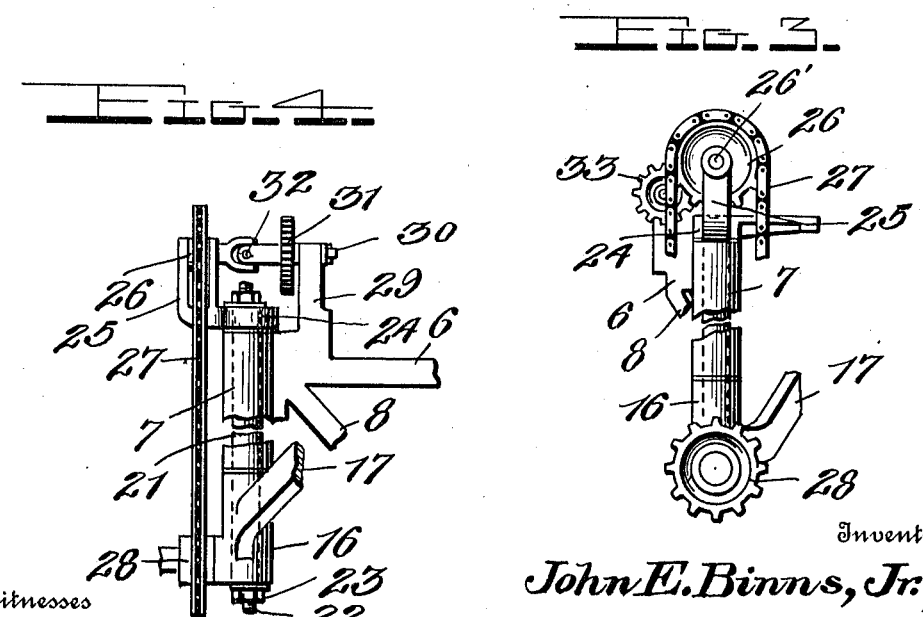
Witnesses
Chas. L. Grieshauer
L. G. Ellis
Inventor
John E. Binns, Jr.,
By Watson E. Coleman
Attorney

UNITED STATES PATENT OFFICE.

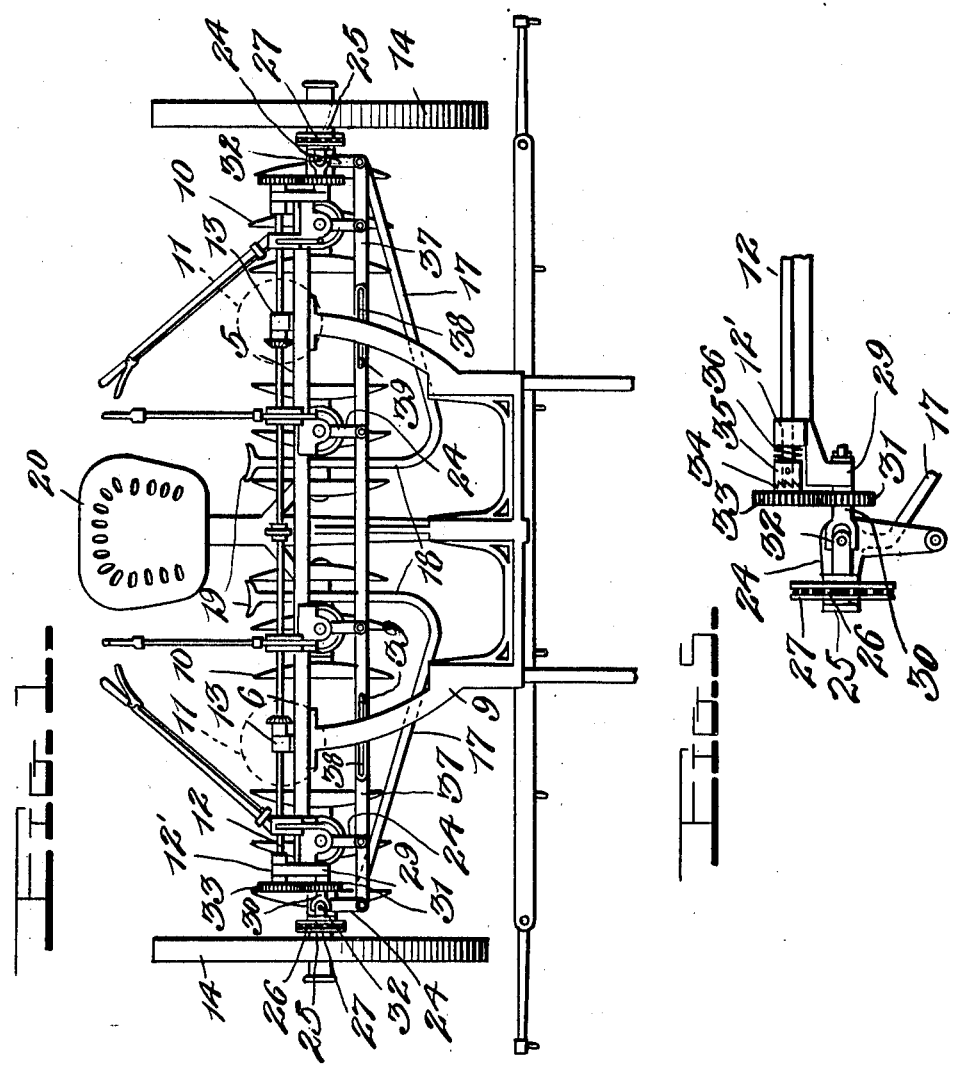

JOHN E. BINNS, JR., OF NASHVILLE, TENNESSEE.

GEARING.

1,020,595.  Specification of Letters Patent.  Patented Mar. 19, 1912.

Application filed April 15, 1911. Serial No. 621,432.

*To all whom it may concern:*

Be it known that I, JOHN E. BINNS, Jr., a citizen of the United States, residing at Nashville, in the county of Davidson and State of Tennessee, have invented certain new and useful Improvements in Gearing, of which the following is a specification, reference being had to the accompanying drawings.

This invention relates to improvements in gearing and more particularly to gearing for operating the seed droping mechanisms of planting machines.

The primary object of the invention resides in the provision of a very simple arrangement of parts so mounted and connected to the ground wheels of the machine as to permit of the free turning movement of said ground wheels without interrupting the operation of the planting mechanism.

A further object of my invention is to provide gearing of the above character including means for permitting of the rotation of one of the ground wheels of the machine at greater speed than the other wheel, said gearing being connected to and driven by both of said wheels.

A still further object of the invention is to provide means whereby the ground wheels of the machine may be easily and quickly guided by the operator.

With the above and other objects in view, the invention consists of the novel features of construction, combination and arrangement of parts hereinafter fully described and claimed, and illustrated in the accompanying drawings, in which—

Figure 1 is a plan view of a combined planter and cultivator showing my improved gearing applied thereto; Fig. 2 is a side elevation of the same; Fig. 3 is an enlarged elevation showing the gearing connecting one of the ground wheels with the seed dropping shaft; Fig. 4 is a side elevation thereof; and Fig. 5 is a top plan view of the same.

Referring in detail to the drawings 5 designates the frame of a combination planter and cultivator which consists of the transverse frame bar 6 upon each end of which a vertical depending tubular leg or standard 7 is formed, said legs being suitably connected and braced by means of the diagonal bars 8. To the transverse bar 6 at opposite sides of its center the forwardly extending substantially U-shaped frame member 9 is secured and upon this frame member the necessary draft attachments are adapted to be arranged as shown in Fig. 1.

In the drawing I have illustrated a double row cultivator of the disk type, the disk gangs 10 being adjustably mounted upon the frame 5. The means utilized for the purpose of adjusting these disk gangs is made the subject matter of a separate application for patent filed April 10th, 1911, Serial No. 620,065.

The seed boxes 11 are mounted upon the frame 5 on opposite sides of its center and the seed dropping shaft 12 is mounted in suitable bearings 13 fixed to the transverse frame bar 6. This dropping shaft extends beneath the seed boxes and is suitably geared to the seed dropping mechanism.

The present invention relates specifically to the gearing which I employ for driving the seed dropping shaft for the actuation of the mechanism arranged in the seed boxes 11. To this end, the ground wheels 14 are each provided with a hub 15 which is journaled on the lower end of a vertical arm 16 formed on the foot bar 17 which extends forwardly and inwardly. The end portions of these foot bars are rearwardly extended in parallel relation as indicated at 18 and have suitable foot plates 19 formed on their rear ends, said plates being located adjacent to the operator's seat 20 which is mounted on the frame so that they may be conveniently engaged by the foot of the operator. The vertical arm 16 is tubular in form and receives a pivot rod 21 which extends through the tubular leg 7 of the frame and into the arm 16. The bore of this arm is reduced to receive the reduced lower end 22 of the pivot rod and forms a shoulder in said arm to provide a seat for the lower end of the body of said rod. A nut 23 is threaded on the reduced end 22 of the pivot rod and engages the under side of the arm 16 to rigidly secure said pivot rod therein. The upper end of the pivot rod projects above the tubular leg 7 and has fixed thereon a bell crank lever 24. Upon one end of this bell crank lever the vertically disposed spaced ears 25 are formed between which a sprocket wheel 26 is mounted. This sprocket is connected by means of the chain 27 with a similar sprocket 28 fixed upon the hub 15 of the wheel.

A bearing 29 is formed on the end of the transverse frame bar 6 and has mounted therein a shaft 30 to which a pinion 31 is fixed. The opposed ends of this pinion shaft and of the shaft 26' of the sprocket 26 are connected by means of the universal joint 32. The end bearings 12' of the seed dropping shaft 11 are integrally formed with the bearings 29 and upon each end of the shaft 11 a pinion 33 is loosely mounted and meshes with the teeth of the pinion 31. A clutch head 34 is keyed to the end of the shaft 11 in spaced relation to the bearing 12' and a clutch head 35 carried by the pinion 33 co-acts therewith, said pinion being normally locked on the shaft 11.

Between the longitudinally slidable clutch head 34 and the bearing 12' a coiled spring 36 is arranged and normally acts to force said head outwardly on the shaft into engagement with the clutch head 35. In this manner, it will be observed, that in the event of one of the ground wheels rotating at greater speed than the other, the clutch head 34 will be moved inwardly on the end of the dropping shaft 11 so that the pinion 33 turns loosely on said shaft while the other pinion on the opposite end of the shaft which is geared to the other of the driving wheels is moved at a slower rate of speed and is locked on the shaft and rotates the same. Thus in the turning movement of the machine, the shaft is rotated by the gearing connecting the same with the inside wheel, the gearing at the other end of said shaft being momentarily disconnected from said haft until the machine again moves in a straight line when the spring 36 engages the clutch heads, thereby connecting both ends of the dropping shaft to the drive wheels through the medium of the gearings.

The other arms of the bell crank levers 24 which extend at right angles to the arms upon which the sprocket wheels 26 are mounted are connected for independent movement through the medium of a sectional bar 37 the end sections of which are pivoted to the bell cranks and extend at their inner ends beneath the ends of the central section of said bar. This central section is provided in each of its ends with a slot 38 to receive a pin 39 fixed in the end section of the bar. The disk gangs 10 are rotatably mounted on the frame bar 6 in suitable bearings and are pivotally connected by means of the arms 39 with the sections of the bar which connect the bell cranks 24. By means of these connections it will be observed that when the operator moves one of the foot bars 17, the pivot rod 21 will be rotated in the tubular leg 7, and as the ground wheel is journaled on said arm the wheel will be turned and disposed at an angle with relation to the line of movement of the machine. The sectional bar 37 will therefore be moved transversely and the other of the ground wheels also disposed at an angle. The disk gangs are simultaneously rotated in their bearings on the frame and disposed in planes parallel to the plane of movement of the wheels of the machine. In this operation the planting of the grain is continuous and is not interfered with in any manner. It will also be noted that in this movement of the ground wheel, the sprocket chain 27 which connects the sprocket wheels 26 and 28 is not twisted but moves with the wheel owing to the rigid connection of the wheel and the bell crank 24 to the vertical pivot rod 21, the universal connection 32 permitting of the angular disposition of the sprocket shaft 26' with relation to the pinion shaft 30.

From the foregoing it is thought that the construction and operation of my improved gearing and the various advantages accruing to the peculiar construction and arrangment of the parts, will be readily seen. The invention is comparatively simple, and of great efficiency and durability in use. As the operator may at any time direct the movement of the wheels of the machine, obstructions in the path thereof may be readily avoided so as to prevent breaking of the disk gangs. The gearing is also extremely positive in its operation and may be readily assembled without requiring the employment of skilled labor. The invention can also be produced at a comparatively low cost.

While I have shown and described the preferred construction and arrangement of the various parts, it will be understood that the invention is susceptible of considerable modification without departing from the essential feature or sacrificing any of the advantages thereof.

Having thus described the invention what is claimed is:—

1. The combination with a frame having a vertical depending tubular leg integrally formed therewith, of a vertical rod rotatably mounted in said leg and extending above and below the same, a foot bar having a vertical tubular arm to receive the lower end of said rod, a nut threaded on the lower end of the rod to rigidly secure said foot bar thereon, a drive wheel journaled upon said vertical arm, a bell crank lever fixed upon the upper end of said vertical rod, a sprocket rotatably mounted on said lever, a driven shaft mounted in the frame, gearing connecting said driven shaft and the sprocket, said connection including means whereby said sprocket may be angularly disposed with relation to the longitudinal axis of the driven shaft when said vertical rod is rotated by pressure upon the foot bar, and a flexible driving connection between said sprocket and the drive wheel.

2. The combination with a frame having a vertical depending tubular leg integrally formed therewith, of a vertical rod rotatably mounted in said leg and extending above and below the same, a foot bar having a tubular arm to receive the lower end of said rod, a nut threaded on the lower end of said rod to removably secure said foot bar thereto, a drive wheel journaled on said arm, a bell crank lever arranged on the upper end of the rod, a nut threaded upon the upper end of said rod to rigidly secure said lever thereon, a sprocket mounted upon said lever, a driven shaft mounted in the frame, gearing connecting said driven shaft and the sprocket whereby said sprocket may be angularly disposed with relation to the driven shaft upon the rotation of said vertical rod, and a drive chain connecting said sprocket and the drive wheel.

In testimony whereof I hereunto affix my signature in the presence of two witnesses.

JOHN E. BINNS, Jr.

Witnesses:
D. W. BINNS,
R. A. RHODES.

Copies of this patent may be obtained for five cents each, by addressing the "Commissioner of Patents, Washington, D. C."